(12) United States Patent
Torai et al.

(10) Patent No.: US 12,524,690 B2
(45) Date of Patent: Jan. 13, 2026

(54) SUPPORT SYSTEM AND SUPPORT METHOD

(71) Applicant: YOKOGAWA ELECTRIC CORPORATION, Tokyo (JP)

(72) Inventors: Soichiro Torai, Musashino (JP); Emiko Hatsugai, Musashino (JP); Hirari Satou, Musashino (JP)

(73) Assignee: Yokogawa Electric Corporation, Tokyo (JP)

( * ) Notice: Subject to any disclaimer, the term of this patent is extended or adjusted under 35 U.S.C. 154(b) by 789 days.

(21) Appl. No.: 17/758,559

(22) PCT Filed: Dec. 1, 2020

(86) PCT No.: PCT/JP2020/044752
§ 371 (c)(1),
(2) Date: Jul. 8, 2022

(87) PCT Pub. No.: WO2021/145081
PCT Pub. Date: Jul. 22, 2021

(65) Prior Publication Data
US 2023/0065717 A1 Mar. 2, 2023

(30) Foreign Application Priority Data
Jan. 16, 2020 (JP) .................. 2020-005320

(51) Int. Cl.
*G06F 16/00* (2019.01)
*G06N 7/01* (2023.01)
*G06Q 50/02* (2012.01)

(52) U.S. Cl.
CPC .............. *G06N 7/01* (2023.01); *G06Q 50/02* (2013.01)

(58) Field of Classification Search
CPC .... A01G 31/02; A01G 31/042; A01G 9/0297; A01G 9/247; A01G 9/249; G05B 15/02;
(Continued)

(56) References Cited

U.S. PATENT DOCUMENTS

| | | | | |
|---|---|---|---|---|
| 2019/0259108 | A1* | 8/2019 | Bongartz | A01G 31/02 |
| 2021/0248691 | A1* | 8/2021 | Ito | A01G 9/24 |
| 2022/0415508 | A1* | 12/2022 | Hatakeyama | G01N 33/0098 |
| 2024/0032484 | A1* | 2/2024 | Rytterborn | A01G 31/04 |

FOREIGN PATENT DOCUMENTS

| | | |
|---|---|---|
| CN | 106645563 A | 5/2017 |
| CN | 107783522 A | 3/2018 |

(Continued)

OTHER PUBLICATIONS

Japanese Office Action (JPOA) mailed Oct. 8, 2024 issued for Japanese patent application No. 2020-5320 and its English translation as a concise explanation of the relevance of Non-Patent Literature Documents No. 2-3.
(Continued)

*Primary Examiner* — Shyue Jiunn Hwa
(74) *Attorney, Agent, or Firm* — RANKIN, HILL & CLARK LLP

(57) ABSTRACT

A support system (1) of the present disclosure includes a first memory (12) storing data indicating an environment of a cultivation facility (60) and data indicating an occurrence status of disease and pests, and a first controller (11) that performs machine learning using the data indicating the environment and the data indicating the occurrence status of disease and pests acquired from the first memory (12) to generate a prediction model for predicting a probability of occurrence of disease and pests in the cultivation facility (60).

9 Claims, 17 Drawing Sheets

(58) Field of Classification Search
CPC ...... G06F 40/30; G06F 16/245; G06F 16/258; G06F 16/252; G06F 40/274; G06F 40/53; G06F 40/58; G06F 3/0383; G06N 20/00; G06Q 10/0639; G06Q 50/02; Y02A 40/25; Y02P 60/21; H04L 41/0226; H04L 12/46

See application file for complete search history.

(56) References Cited

FOREIGN PATENT DOCUMENTS

| | | |
|---|---|---|
| CN | 109643431 A | 4/2019 |
| CN | 110519984 A | 11/2019 |
| EP | 3550498 A1 | 10/2019 |
| JP | 2018-85981 A | 6/2018 |
| JP | 2018190127 A | 11/2018 |
| JP | 2019170359 A | 10/2019 |
| WO | 2018/047726 A1 | 3/2018 |
| WO | 2020/255677 A1 | 12/2020 |

OTHER PUBLICATIONS

Yuki Horita et al., "Bayesian network for customer clustering in beauty salons", 2018 Spring Conference of the Japan Industrial Management Association, pp. 60 to 61, May 25, 2018.

Ayae Ide et al., "Probabilistic Latent Semantic Structure Modeling Based on The Large Scale Elderly Living Activities Survey", The Japanese Society for Artificial Intelligence Research Institute, SIG-SAI 027 [online], Nov. 11, 2016; English abstract.

* cited by examiner

FIG. 3

Location: Tokyo
Variety: A

| Time | $CO_2$ concentration [ppm] | Amount of solar radiation [W/m$^2$] | Temperature [°C] | Humidity [%] | Presence of gray mold |
|---|---|---|---|---|---|
| t1 | 450 | 350 | 20 | 85 | 0 |
| t2 | 455 | 380 | 22 | 88 | 0 |
| t3 | 460 | 400 | 21 | 90 | 0 |
| t4 | 465 | 420 | 20 | 89 | 1 |
| ⋮ | ⋮ | ⋮ | ⋮ | ⋮ | ⋮ |

Location: Hokuriku
Variety: B

| Time | $CO_2$ concentration [ppm] | Amount of solar radiation [W/m$^2$] | Temperature [°C] | Humidity [%] | Powdery mildew |
|---|---|---|---|---|---|
| T1 | 350 | 600 | 15 | 92 | 0 |
| T2 | 360 | 605 | 16 | 88 | 1 |
| T3 | 365 | 630 | 18 | 90 | 1 |
| T4 | 370 | 680 | 20 | 89 | 1 |
| ⋮ | ⋮ | ⋮ | ⋮ | ⋮ | ⋮ |

Raw data

| Time | CO$_2$ concentration [ppm] | Amount of solar radiation [W/m$^2$] | Temperature [°C] | Humidity [%] | Presence of gray mold |
|---|---|---|---|---|---|
| ⋮ | ⋮ | ⋮ | ⋮ | ⋮ | ⋮ |
| t10 | 423 | 360 | 21 | 68 | 0 |
| ⋮ | ⋮ | ⋮ | ⋮ | ⋮ | ⋮ |
| t20 | 445 | 420 | 26 | 72 | 0 |
| ⋮ | ⋮ | ⋮ | ⋮ | ⋮ | ⋮ |
| t30 | 385 | 475 | 23 | 80 | 1 |
| ⋮ | ⋮ | ⋮ | ⋮ | ⋮ | ⋮ |

Discretization

| Time | CO$_2$ concentration [ppm] | Amount of solar radiation [W/m$^2$] | Temperature [°C] | Humidity [%] | Presence of gray mold |
|---|---|---|---|---|---|
| ⋮ | ⋮ | ⋮ | ⋮ | ⋮ | ⋮ |
| t10 | 400-450 | 350-400 | 20-25 | 60-70 | 0 |
| ⋮ | ⋮ | ⋮ | ⋮ | ⋮ | ⋮ |
| t20 | 400-450 | 400-450 | 25-30 | 70-80 | 0 |
| ⋮ | ⋮ | ⋮ | ⋮ | ⋮ | ⋮ |
| t30 | 350-400 | 450-500 | 20-25 | 80-90 | 1 |
| ⋮ | ⋮ | ⋮ | ⋮ | ⋮ | ⋮ |

FIG. 5

Clustering result

| Time | CO₂ concentration [ppm] | Amount of solar radiation [W/m²] | Temperature [°C] | Humidity [%] | Presence of gray mold | Cluster |
|---|---|---|---|---|---|---|
| ... | ... | ... | ... | ... | ... | ... |
| t10 | 400-450 | 350-400 | 20-25 | 60-70 | 0 | 1 |
| ... | ... | ... | ... | ... | ... | ... |
| t20 | 400-450 | 400-450 | 25-30 | 70-80 | 0 | 2 |
| ... | ... | ... | ... | ... | ... | ... |
| t30 | 350-400 | 450-500 | 20-25 | 80-90 | 1 | 1 |
| ... | ... | ... | ... | ... | ... | ... |

FIG. 8

Clustering result

| Sensor group No. | Explanatory variable 1 t1 | Explanatory variable 1 t2 | ... | Explanatory variable 2 t1 | Explanatory variable 2 t2 | ... | Cluster |
|---|---|---|---|---|---|---|---|
| No. 1 | | | | | | | 1 |
| No. 2 | | | | | | | 1 |
| No. 3 | | | | | | | 1 |
| ... | ... | ... | ... | ... | ... | ... | ... |
| No. 25 | | | | | | | 9 |
| No. 26 | | | | | | | 9 |
| No. 27 | | | | | | | 9 |

FIG. 14
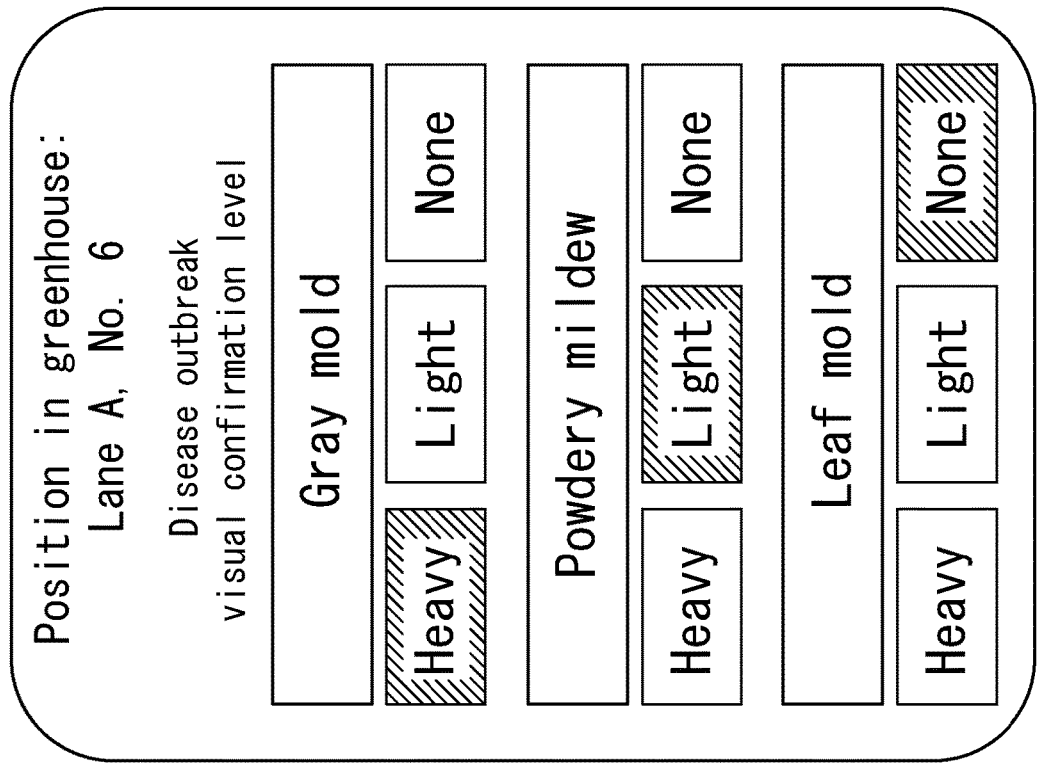
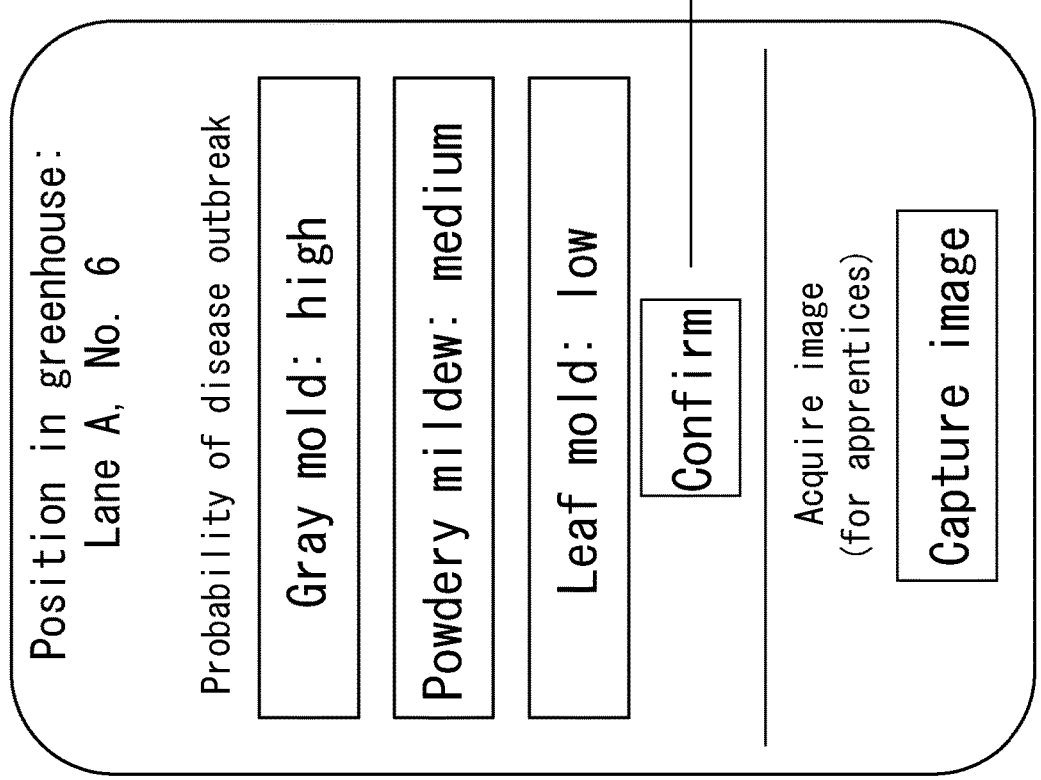

FIG. 16

With control

| Sensor group No. | Current time | Next day | 2 days later | 3 days later | 4 days later | 5 days later | Control plan | |
|---|---|---|---|---|---|---|---|---|
| | | | | | | | Name of chemical | By when |
| No.1 | None | 10% | 10% | 30% | 30% | 50% | A (prevention) | Within 4 days |
| No.2 | Light | 40% | 50% | 60% | 60% | 80% | B (fungicide) | Within 2 days |
| ... | ... | ... | ... | ... | ... | ... | ... | ... |

Without control

| Sensor group No. | Current time | Next day | 2 days later | 3 days later | 4 days later | 5 days later | Control plan | |
|---|---|---|---|---|---|---|---|---|
| | | | | | | | Name of chemical | By when |
| No.1 | None | 20% | 30% | 50% | 70% | 80% | A (prevention) | Within 2 days |
| No.2 | Light | 60% | 70% | 80% | 80% | 90% | B (fungicide) | Immediately |
| ... | ... | ... | ... | ... | ... | ... | ... | ... |

SUPPORT SYSTEM AND SUPPORT METHOD

CROSS-REFERENCE TO RELATED APPLICATION

The present application claims priority to Japanese Patent Application No. 2020-5320 filed on Jan. 16, 2020, the entire contents of which are incorporated herein by reference.

TECHNICAL FIELD

The present disclosure relates to support systems and support methods for supporting cultivation managers.

BACKGROUND

Conventional technology for understanding the occurrence status of disease and pests in a cultivation facility includes, for example, the technology disclosed in Patent Literature (PTL) 1. In the technology disclosed in PTL 1, when a worker discovers disease or pests during harvesting or other tasks, the worker uses a mobile terminal to transmit information on the discovery of the disease or pests to a management terminal. The management terminal then creates a disease and pest management table, based on the disease and pest detection information received from the mobile terminal, and outputs the table to a monitor or the like.

CITATION LIST

Patent Literature

PTL 1: JP 2018-85981 A

SUMMARY

Technical Problem

With the technology disclosed in PTL 1, it is not possible to understand the occurrence status of disease and pests comprehensively in a cultivation facility unless the worker checks for the occurrence of disease and pests in all areas of the cultivation facility. Therefore, the technology disclosed in PTL 1 has room for improvement in terms of efficiently understanding the occurrence status of disease and pests in a cultivation facility.

The present disclosure aims to provide a support system and a support method that enable an efficient understanding of the occurrence status of disease and pests in a cultivation facility.

Solution to Problem

A support system according to an embodiment includes a first memory storing data indicating an environment of at least one cultivation facility and data indicating an occurrence status of disease and pests; and a first controller configured to perform machine learning using the data indicating the environment and the data indicating the occurrence status of disease and pests acquired from the first memory to generate a prediction model for predicting a probability of occurrence of disease and pests in the cultivation facility.

This enables a cultivation manager to efficiently understand the occurrence status of disease and pests in the cultivation facility.

In an embodiment, the support system may further include a sensor group configured to measure the data indicating the environment of the cultivation facility; a second controller configured to input the data indicating the environment acquired from the sensor group to the prediction model and predict the probability of occurrence of the disease and pests in the cultivation facility; and an output interface configured to output the probability of occurrence of the disease and pests predicted by the second controller.

This enables the cultivation manager to prioritize management of areas with a high probability of occurrence of disease and pests within each cultivation facility.

In an embodiment, the output interface may further output data indicating an actual occurrence status of the disease and pests in the cultivation facility.

This enables the cultivation manager to efficiently understand the prediction accuracy of the prediction model.

In an embodiment, the second controller may update the prediction model by performing machine learning using the data indicating the environment measured by the sensor group and the data indicating the actual occurrence status of the disease and pests.

This can improve the prediction accuracy of the prediction model for each cultivation facility.

In an embodiment, the second controller may control an environmental control apparatus installed in the cultivation facility to reduce the probability of occurrence of the disease and pests in the cultivation facility based on an input from a cultivation manager. This can suppress damage by disease and pests.

In an embodiment, the second controller may generate a control plan for the disease and pests based on the probability of occurrence of the disease and pests in the cultivation facility, and the output interface may output the control plan generated by the second controller.

This enables a cultivation manager to efficiently manage the cultivation facility based on the control plan.

In an embodiment, the second controller may optimize a location and/or number of sensors included in the sensor group based on the data indicating the environment of the cultivation facility, and the output interface may output the optimized location and/or number of the sensors.

This can reduce the cost of managing the cultivation facility.

A support method according to an embodiment is a support method using a computer and includes performing, by the computer, machine learning using data indicating an environment of at least one cultivation facility and data indicating an occurrence status of disease and pests to generate a prediction model for predicting a probability of occurrence of disease and pests in the cultivation facility.

This enables a cultivation manager to efficiently understand the occurrence status of disease and pests in the cultivation facility.

In an embodiment, the support method may further include acquiring, by the computer, the data indicating the environment of the cultivation facility; inputting, by the computer, the acquired data indicating the environment to the prediction model and predicting the probability of occurrence of disease and pests in the cultivation facility; and outputting, by the computer, the predicted probability of occurrence of disease and pests.

This enables the cultivation manager to prioritize management of areas with a high probability of occurrence of disease and pests within each cultivation facility.

Advantageous Effect

According to the present disclosure, a support system and a support method that enable an efficient understanding of the occurrence status of disease and pests in a cultivation facility can be provided.

BRIEF DESCRIPTION OF THE DRAWINGS

In the accompanying drawings:

FIG. 3 is a schematic diagram illustrating the process of step S101 in FIG. 2;

FIG. 5 is a schematic diagram illustrating the process of step S103 in FIG. 2;

FIG. 8 is a schematic diagram illustrating the process of step S203 in FIG. 7;

FIG. 14 is a schematic diagram illustrating an example screen of a mobile terminal;

FIG. 16 is a schematic diagram illustrating example output of the process of step S407 in FIG. 15.

DETAILED DESCRIPTION

Figure 1:
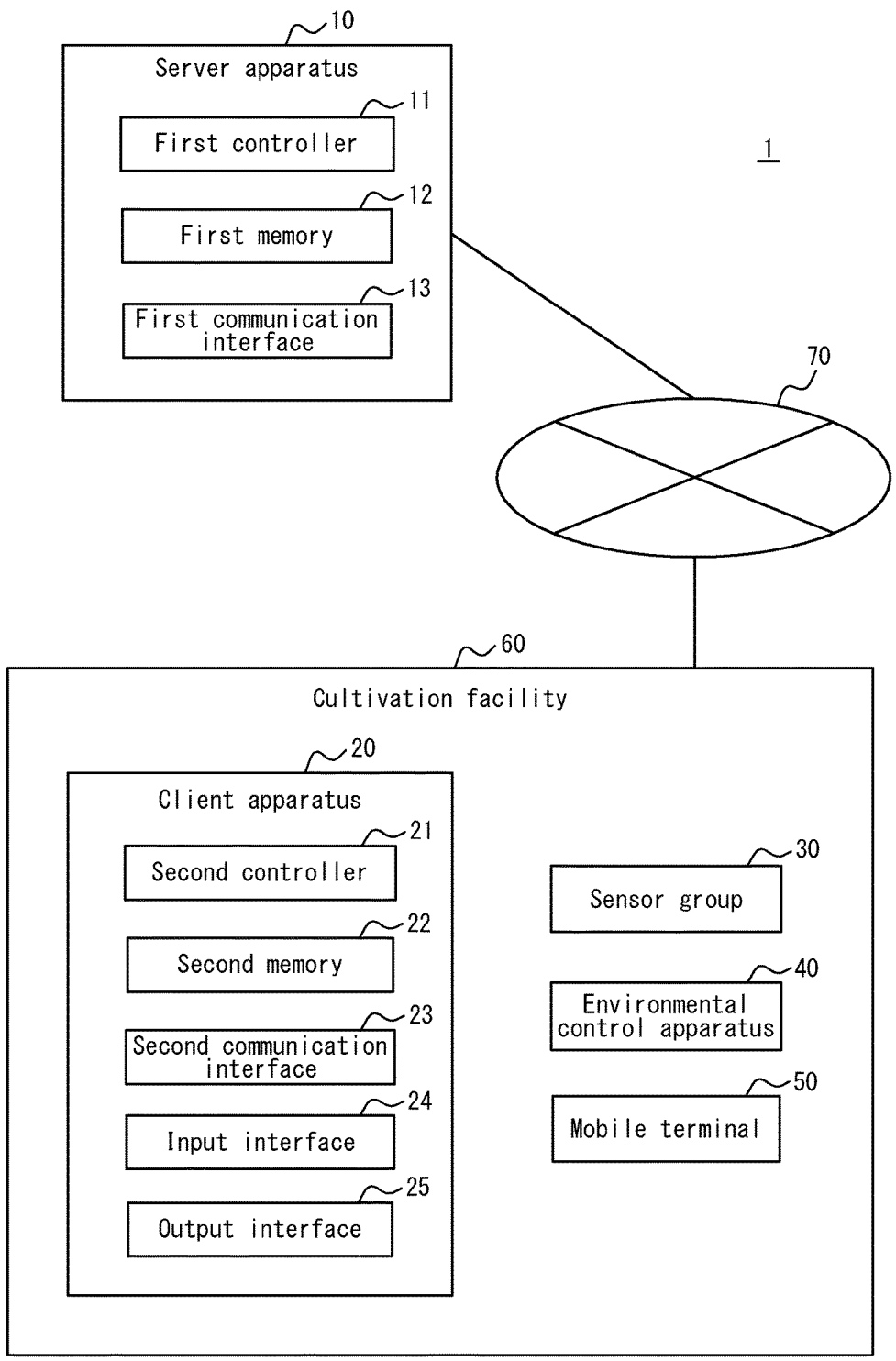
FIG. 1 is a functional block diagram illustrating the configuration of a support system according to the present embodiment.

Embodiments of the present disclosure are described below with reference to the drawings. Identical reference signs in the drawings indicate identical or equivalent constituent elements.

With reference to FIG. 1, a configuration of a support system 1 according to an embodiment of the present disclosure is described.

The support system 1 includes a server apparatus 10, a client apparatus 20, a sensor group 30, an environmental control apparatus 40, and a mobile terminal 50. The server apparatus 10 can communicate with the client apparatus 20 via a network 70 such as the Internet. The server apparatus 10 may also be capable of communicating with the sensor group 30, the environmental control apparatus 40, and the mobile terminal 50 via the network 70. The client apparatus 20, the sensor group 30, and the environmental control apparatus 40 are each installed in at least one cultivation facility 60, such as cultivation facilities 60 across the country. The mobile terminal 50 is carried by a cultivation manager.

The server apparatus 10 is, for example, a server belonging to a cloud computing system or the like.

The server apparatus 10 includes a first controller 11, a first memory 12, and a first communication interface 13.

The first controller 11 includes one or more processors. The processor may, for example, be a general-purpose processor, such as a central processing unit (CPU), or a dedicated processor specialized for particular processing. The first controller 11 controls each component of the server apparatus 10 while performing processing related to operations of the server apparatus 10.

The first memory 12 includes one or more semiconductor memories, one or more magnetic memories, one or more optical memories, or a combination of these. The semiconductor memory is, for example, random access memory (RAM) or read only memory (ROM). The first memory 12 stores information used in operations of the server apparatus 10 and information acquired by operations of the server apparatus 10.

The first communication interface 13 includes one or more communication interfaces capable of communicating over, for example, the Internet, a gateway, a local area network (LAN), or the like. The first communication interface 13 receives information used in the operations of the server apparatus 10 and transmits information obtained by operations of the server apparatus 10.

The operations of the server apparatus 10 are implemented by a processor included in the first controller 11 executing a program stored in the first memory 12.

The client apparatus 20 is, for example, a mobile phone, a smartphone, a tablet, a personal computer (PC), or the like.

The client apparatus 20 includes a second controller 21, a second memory 22, a second communication interface 23, an input interface 24, and an output interface 25.

The second controller 21 includes one or more processors. The processor may, for example, be a general-purpose processor, such as a central processing unit (CPU), or a dedicated processor specialized for particular processing. The second controller 21 controls each component of the client apparatus 20 while performing processing related to operations of the client apparatus 20.

The second memory 22 includes one or more semiconductor memories, one or more magnetic memories, one or more optical memories, or a combination of these. The semiconductor memory is, for example, random access memory (RAM) or read only memory (ROM). The second memory 22 stores information used in operations of the client apparatus 20 and information acquired by operations of the client apparatus 20.

The second communication interface 23 includes one or more communication interfaces capable of communicating over, for example, the Internet, a gateway, a local area network (LAN), or the like. The second communication interface 23 receives information used in the operations of the client apparatus 20 and transmits information obtained by operations of the client apparatus 20.

The input interface 24 includes one or more interfaces for input. The interface for input is, for example, a physical key, a capacitive key, a pointing device, a touchscreen integrally provided with a display, a microphone, or a combination of these. The input interface 24 receives operations to input information used in operations of the client apparatus 20.

The output interface 25 includes one or more interfaces for output. The interface for output may, for example, be a display such as a liquid crystal display (LCD) or an organic electro luminescence (EL) display, a speaker, or a combination of these. The output interface 25 outputs information obtained by operations of the client apparatus 20.

The operations of the client apparatus 20 are implemented by a processor included in the second controller 21 executing a program stored in the second memory 22.

The sensor group 30 includes one or more sensors. Non-limiting examples of the include $CO_2$ concentration meters, pyranometers, thermometers, hygrometers, or combinations thereof. The sensor group 30 can communicate with the client apparatus 20 by a LAN or the like.

The environmental control apparatus 40 includes, but is not limited to, water sprinklers, lighting, air conditioning, curtains, skylights, $CO_2$ generators, or combinations thereof. The environmental control apparatus 40 can communicate with the client apparatus 20 by a LAN or the like. The environmental control apparatus 40 is controlled by the second controller 21 of the client apparatus 20.

The mobile terminal 50 is a mobile phone, a smartphone, a tablet, or the like, but these examples are not limiting. The mobile terminal 50 can communicate with the client apparatus 20 by WiFi®, Bluetooth® (WiFi and Bluetooth are registered trademarks in Japan, other countries, or both), or the like.

The cultivation facility 60 is a field, a glass greenhouse, a plastic greenhouse, or the like, but these examples are not limiting.

In the above configuration, some or all of the processing by the first controller 11 of the server apparatus 10 may be executed by the second controller 21 of the client apparatus 20. Alternatively, some or all of the processing by the second controller 21 of the client apparatus 20 may be executed by the first controller 11 of the server apparatus 10.

Figure 2:
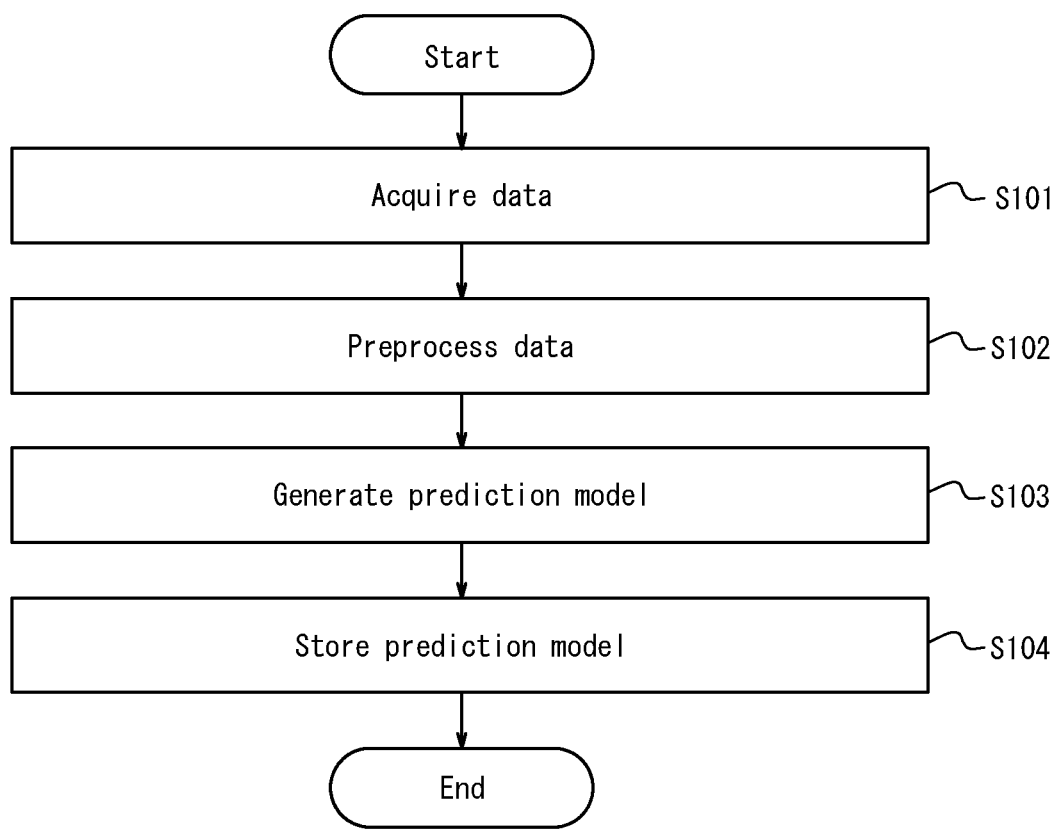
FIG. 2 is a flowchart illustrating a first example of operations by the support system according to the present embodiment.

With reference to FIG. 2, a first example of operations by the support system 1 according to the present embodiment is described. The first example of operations corresponds to an embodiment of a support method according to the present disclosure.

In step S101, the first controller 11 of the server apparatus 10 acquires, via the first communication interface 13, data indicating the environment of each cultivation facility 60 and data indicating the occurrence status of disease and pests at predetermined time intervals from the client apparatus 20 installed in cultivation facilities 60 across the country, preferably in each cultivation facility 60 among a plurality of cultivation facilities 60. The first controller 11 stores the acquired data indicating the environment and data indicating the occurrence status of disease and pests in the first memory 12. As illustrated in FIG. 3, the first controller 11 stores the acquired data in the first memory 12 after classification by location of the cultivation facility 60 (Kanto, Hokuriku, etc.), the variety (A, B, etc.) of the plants and the like cultivated at the cultivation facility 60, and the type of disease or pest (gray mold, powdery mildew, etc.).

The "environment" in the present embodiment includes, but is not limited to, the $CO_2$ concentration, amount of solar radiation, temperature, humidity, or a combination thereof. The data indicating the environment is acquired by the sensor group 30 installed in each cultivation facility 60. The "disease and pests" in the present embodiment include, but are not limited to, gray mold, powdery mildew, leaf mold, or a combination thereof. The occurrence status of disease and pests is determined based on visual confirmation by the cultivation manager or on images captured by a camera or the like. Details are provided in the third example of operations. The "predetermined time intervals" in the present embodiment can be set by the cultivation manager as appropriate, for example from several tens of minutes to several hours, though this example is not limiting.

Figure 4:
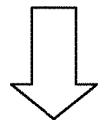
FIG. 4 is a schematic diagram illustrating the process of step S102 in FIG. 2.

In step S102, the first controller 11 acquires, from the first memory 12, the data indicating the environment and the data indicating the occurrence status of disease and pests and performs preprocessing on these data. The "preprocessing" in the present embodiment includes, but is not limited to, missing value processing, outlier processing, normalization processing, discretization processing, or a combination thereof. For example, the "preprocessing" may include the creation of new variables based on sensor values such as derivative values or integral values over a predetermined period (for example, 1 to 6 hours). The discretization processing may include, but is not limited to, equal frequency division, equal number division, chi merge, or a combination of these. These processes are selected as appropriate depending on the clustering technique described below. FIG. 4 illustrates data subjected to discretization processing. In a case in which the probability of occurrence of a particular disease or pest is to be predicted, the objective variable corresponding to the existence of the particular disease or pest may be weighted accordingly.

In step S103, the first controller 11 performs machine learning using the data that was preprocessed in step S102 to generate a prediction model for predicting the probability of occurrence of disease and pests. Details on step S103 are provided below.

Figure 6:
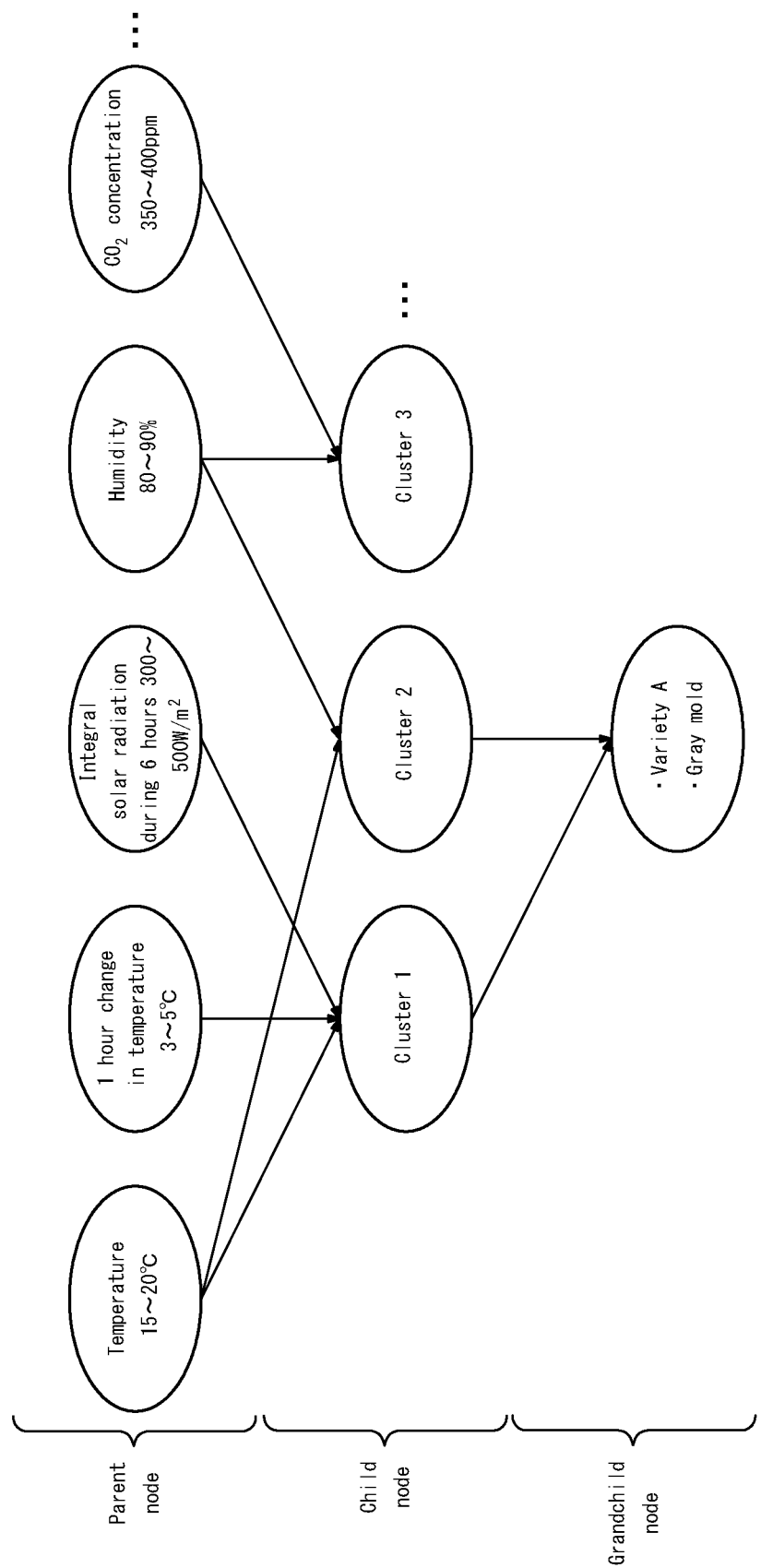
FIG. 6 is a schematic diagram illustrating the process of step S104 in FIG. 2.

For example, the first controller 11 uses clustering and Bayesian network techniques to generate a prediction model in which the variables corresponding to the data indicating the environment are the explanatory variables and the variable corresponding to the existence of disease and pests is the objective variable. A Bayesian network is a directed acyclic graph with variables as nodes and includes conditional probability tables between nodes. Clustering is a method of classifying similar variables into the same cluster. For example, clustering includes, but is not limited to, hard clustering such as the k-means method or soft clustering such as probabilistic latent semantic analysis. In step S103, the first controller 11 first performs clustering with respect to a time series using the data that was preprocessed in step S102. This classifies similar explanatory variables into the same clusters and compresses their dimensions. Clustering is so-called unsupervised learning. However, if there is an objective variable of particular interest that indicates the occurrence status of disease and pests, the variable may be weighted for an appropriate adjustment of the influence of similarity on the variable. FIG. 5 illustrates clustering results. Next, the first controller 11 performs structural learning using the clustering results to generate a prediction model for predicting the probability of occurrence of disease and pests. FIG. 6 illustrates an example of a prediction model that includes parent nodes corresponding to data indicating the environment, child nodes dimensionally compressed by clustering, and a grandchild node corresponding to whether a predetermined disease or pest occurs for a predetermined variety. The parent nodes and the grandchild node need not be linked through the child nodes and may instead be linked directly. In this way, by using a prediction model that combines dimensional compression by clustering and a Bayesian network that visualizes the dependency relationships between nodes, a cultivation manager can efficiently interpret complex biological phenomena in plants and the like.

In step S103, the first controller 11 can perform machine learning using data indicating the environment of the cultivation facility 60 up to the present and data indicating the current occurrence status of disease and pests. This enables the first controller 11 to generate a prediction model that can predict the current probability of occurrence of disease and pests. Additionally, the first controller 11 can perform machine learning using data indicating the past (for example, up to three days ago) environment of the cultivation facility 60 and data indicating the current occurrence status of disease and pests. This enables the first controller 11 to generate a prediction model that can predict the future (for example, three days later) probability of occurrence of disease and pests. This also enables the first controller 11 to generate a prediction model that can predict the current and/or future probability of occurrence of disease and pests for each variety of plant or the like in the cultivation facility 60 and each type of disease and pest.

In step S104, the first controller 11 stores the prediction model generated in step S103 in the first memory 12.

According to changes in the climate or season, the first controller 11 preferably performs steps S101 through S104 to update the prediction model periodically. This can maintain the prediction accuracy of the probability of occurrence of disease and pests even when the climate or season changes.

According to the first example of operations, a cultivation facility 60 can be managed using the prediction model, so that the occurrence status of disease and pests in the cultivation facility 60 can be understood efficiently. While details are provided below, initial costs can also be reduced by using this prediction model as an initial model to predict the probability of occurrence of disease and pests in each cultivation facility 60.

Figure 7:
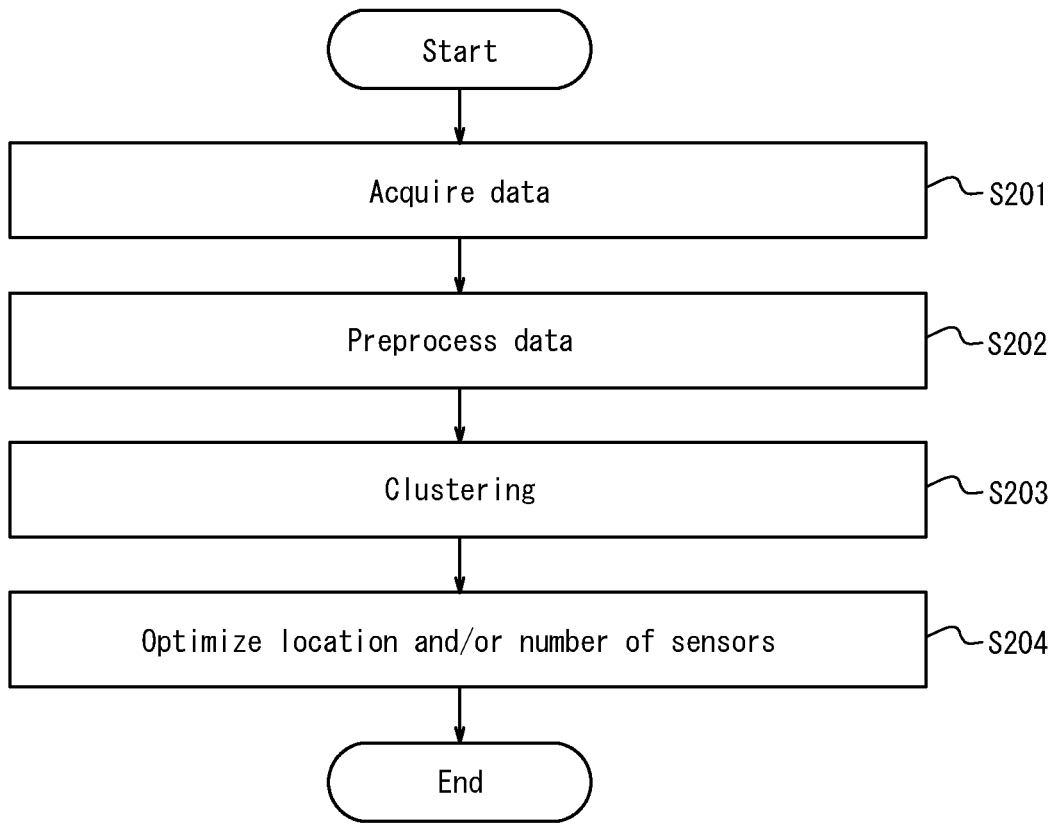
FIG. 7 is a flowchart illustrating a second example of operations by the support system according to the present embodiment.

With reference to FIG. 7, a second example of operations by the support system 1 according to the present embodiment is described. The second example of operations corresponds to an embodiment of a support method according to the present disclosure.

The second example of operations starts in a state in which the second controller 21 of the client apparatus 20 installed in each cultivation facility 60 has acquired the prediction model generated in the first operational example from the server apparatus 10 via the second communication interface 23 and stored the prediction model in the second memory 22. However, the second example of operations need not be performed in all of the cultivation facilities 60 nationwide and may be performed in a particular cultivation facility 60.

In step S201, the second controller 21 of the client apparatus 20 acquires data indicating the environment of the cultivation facility 60 from the sensor group 30 at predetermined time intervals and stores the data in the second memory 22.

In step S202, the second controller 21 acquires the data indicating the environment from the second memory 22 and performs preprocessing on the data. This preprocessing is the same as in step S102.

In step S203, the second controller 21 performs clustering with respect to the sensor group 30 using the data that was preprocessed in step S202. The sensor group 30 is thus classified into clusters based on the similarity of the environment between areas of the cultivation facility 60. FIG. 8 illustrates clustering results. In FIG. 8, the "explanatory variable 1", "explanatory variable 2", etc. correspond to respective data indicating the environment. Furthermore, "t1", "t2", indicate the corresponding time variation. When cost is important, the cultivation manager may forcibly set the number of clusters via the input interface 24.

Figure 9:
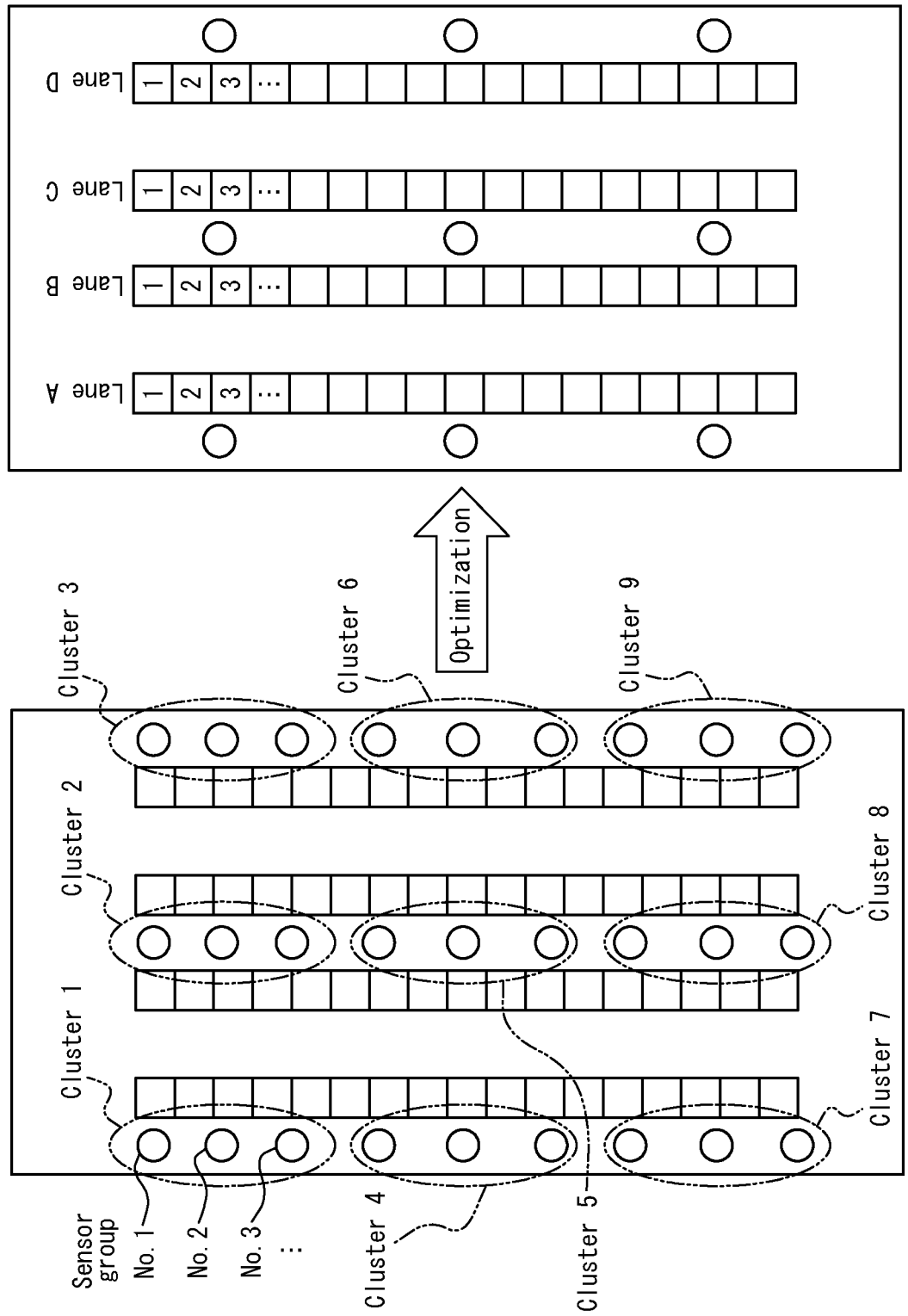
FIG. 9 is a schematic diagram illustrating the process of step S204 in FIG. 7.

In step S204, the second controller 21 optimizes the location and/or number of sensors in the sensor group 30 based on the clustering results of step S203. The second controller 21 outputs the optimized location and/or number of sensors to the cultivation manager via the output interface 25. In FIGS. 8 and 9, the sensor group 30 is classified into nine clusters (clusters 1 through 9). For a plurality of sensors belonging to the same cluster, the second controller 21 can perform optimization such as selecting one of the sensors as representative and eliminating the other sensors. For example, the sensor to become representative (also referred to as a "representative sensor") may be determined so that the distance between representative sensors belonging to the clusters is equal. The eliminated sensors may be used in other cultivation facilities 60 or returned to the leasing company.

The second example of operation enables an understanding of the location and/or number of sensors minimally required to capture differences in the environment of the cultivation facility 60. The cost required to manage the cultivation facility 60 can thereby be reduced. To increase the accuracy of optimization, in addition to data indicating the environment of the cultivation facility 60, data indicating the occurrence status of disease and pests as determined based on visual confirmation by the cultivation manager or images captured by a fixed-point camera or the like may be used in steps S201 through S204.

Figure 10:
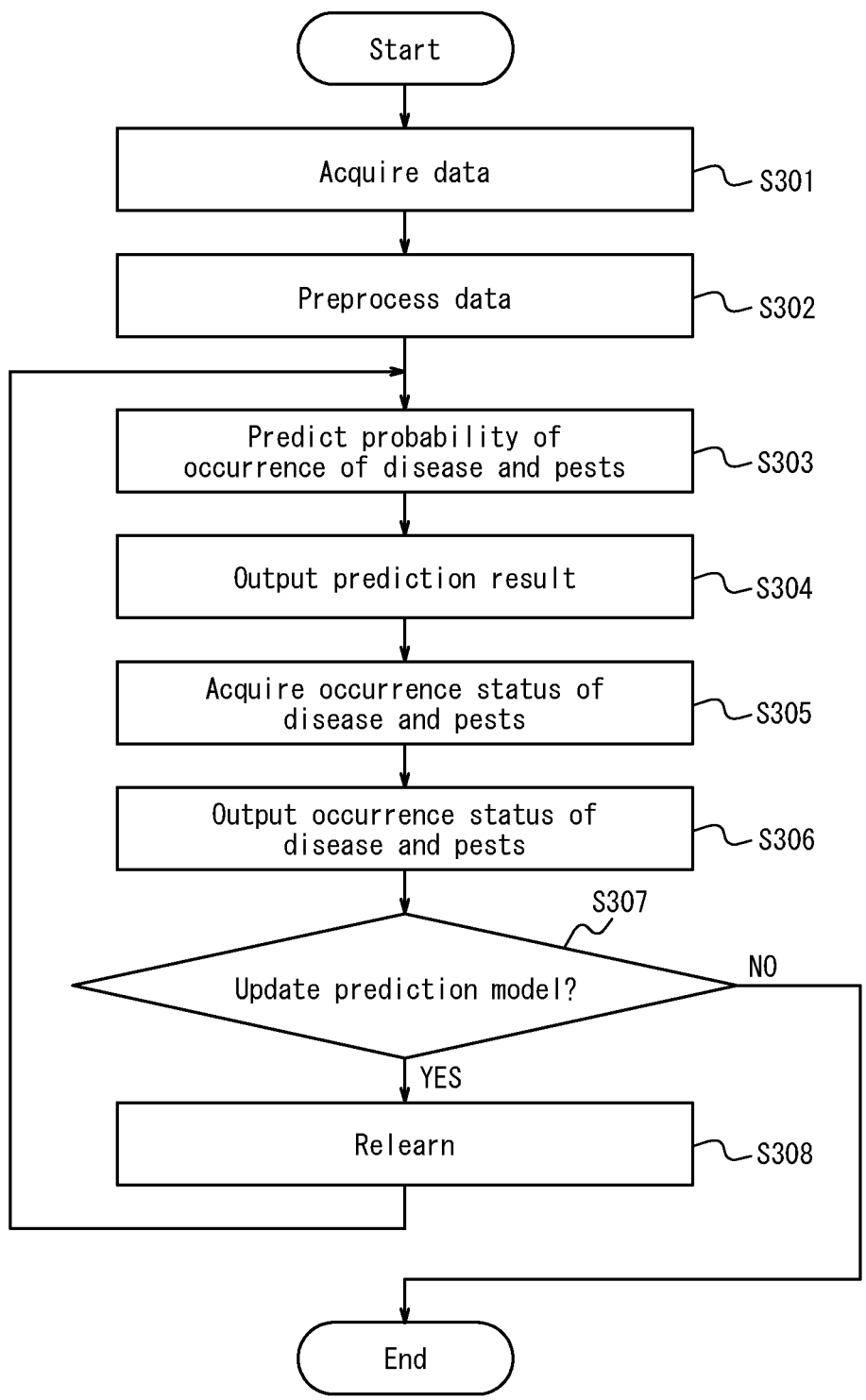
FIG. 10 is a flowchart illustrating a third example of operations by the support system according to the present embodiment.

With reference to FIG. 10, a third example of operations by the support system 1 according to the present embodiment is described. The third example of operations corresponds to an embodiment of a support method according to the present disclosure.

The third example of operations starts in a state in which the second controller 21 of the client apparatus 20 installed in each cultivation facility 60 has acquired the prediction model generated in the first operational example from the server apparatus 10 via the second communication interface 23 and stored the prediction model in the second memory 22. However, the third example of operations need not be performed in all of the cultivation facilities 60 nationwide and may be performed in a particular cultivation facility 60.

In step S301, the second controller 21 of the client apparatus 20 acquires data indicating the environment of the cultivation facility 60 from the sensor group 30 at predetermined time intervals and stores the data in the second memory 22.

Figure 11:
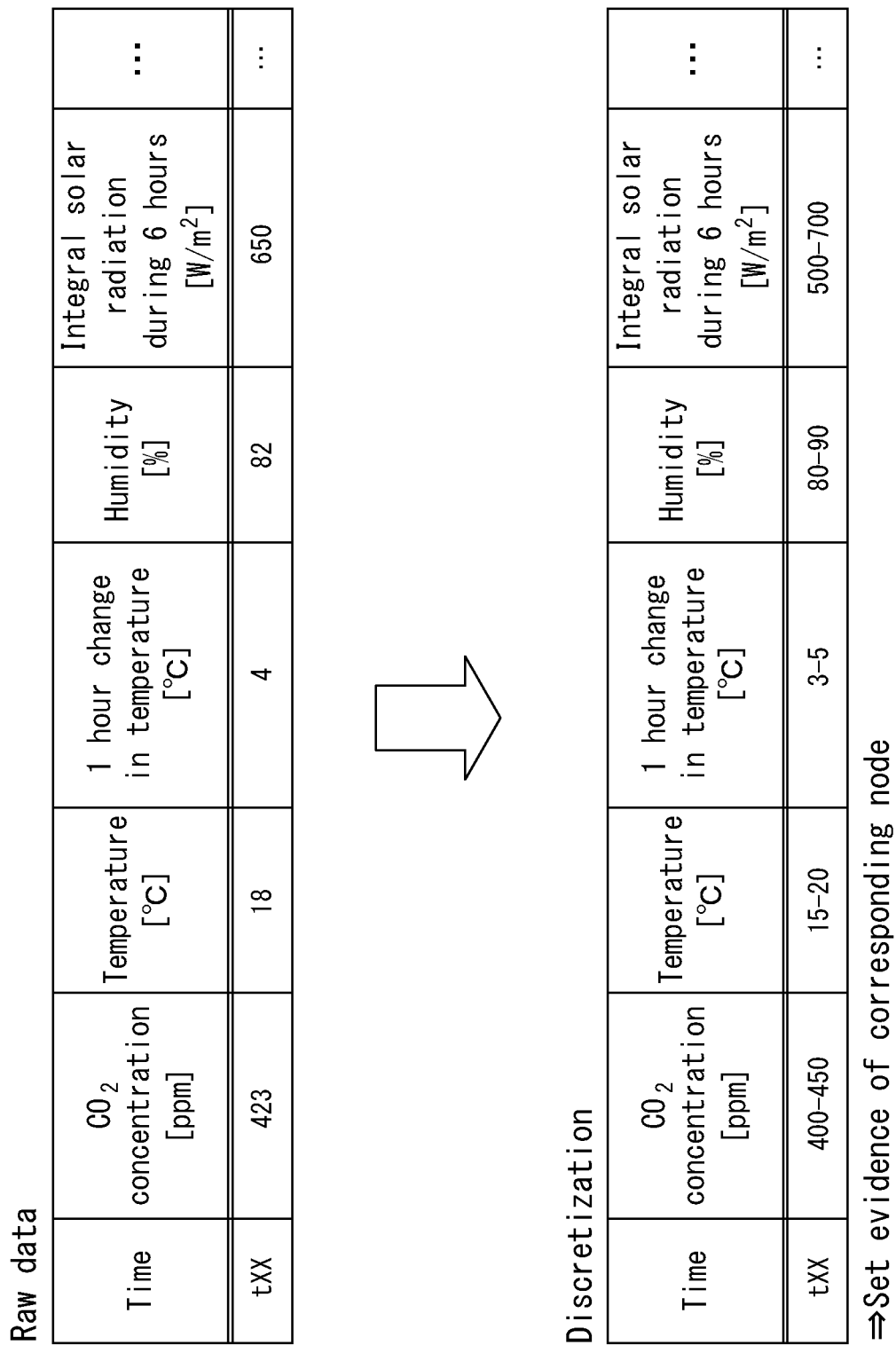
FIG. 11 is a schematic diagram illustrating the process of step S302 in FIG. 10.

In step S302, the second controller 21 acquires the data indicating the environment from the second memory 22 and performs preprocessing on the data. This preprocessing is the same as in step S102. FIG. 11 illustrates data subjected to discretization processing.

Figure 12:
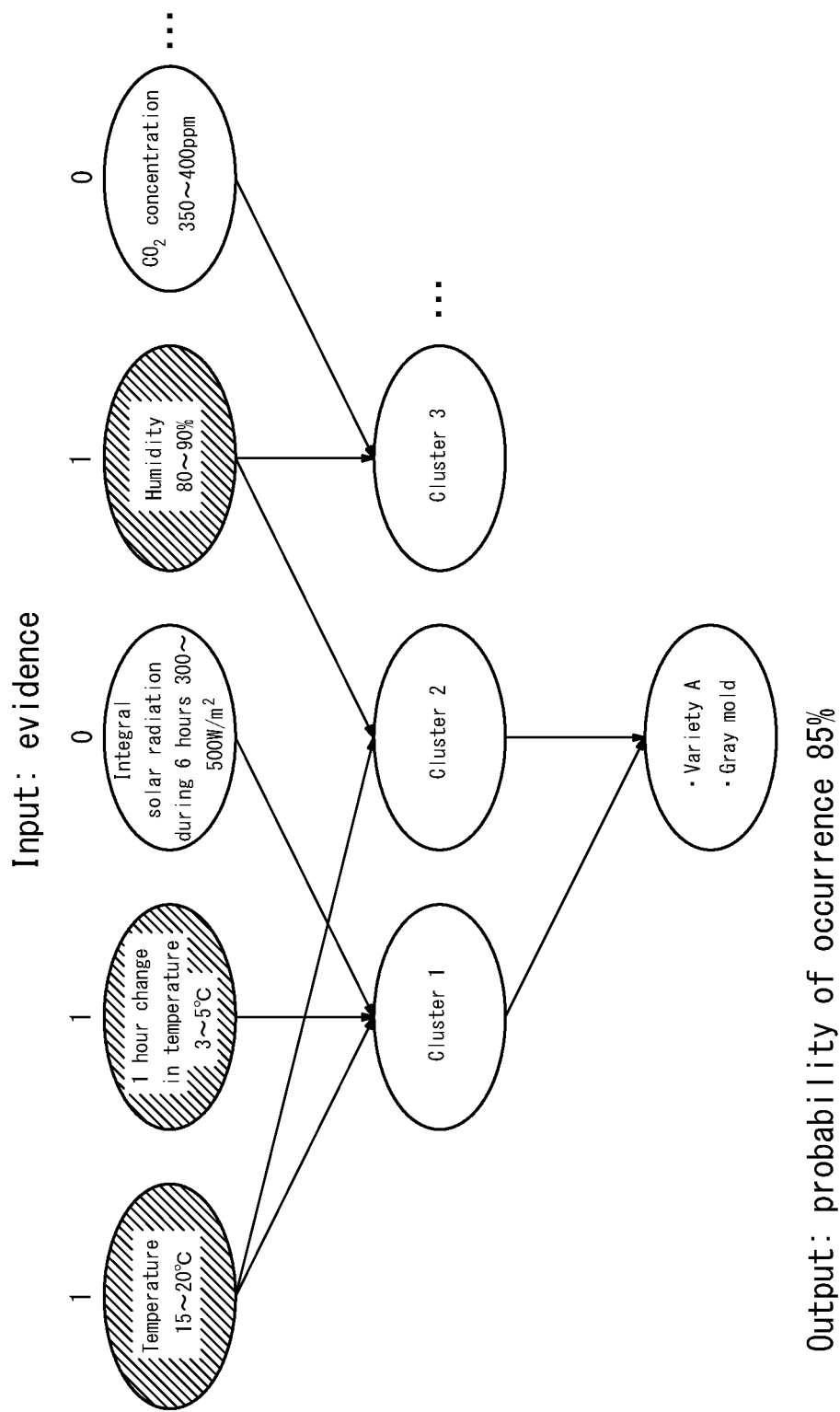
FIG. 12 is a schematic diagram illustrating the process of step S303 in FIG. 10.

In step S303, the second controller 21 acquires the prediction model from the second memory 22 and predicts the current and future probability of occurrence of disease and pests. FIG. 12 illustrates an example of the case of predicting the current probability of occurrence of disease and pests with a prediction model using a Bayesian network and clustering. In the present example, the second controller 21 sets the evidence for the parent nodes corresponding to the data indicating the environment of the cultivation facility 60, acquired in step S301, to "1" and sets the evidence for the other parent nodes to "0". It is thus predicted that, for example, the current probability of occurrence of disease and pests is 85% at the grandchild node corresponding to the occurrence of gray mold in variety A.

Figure 13:
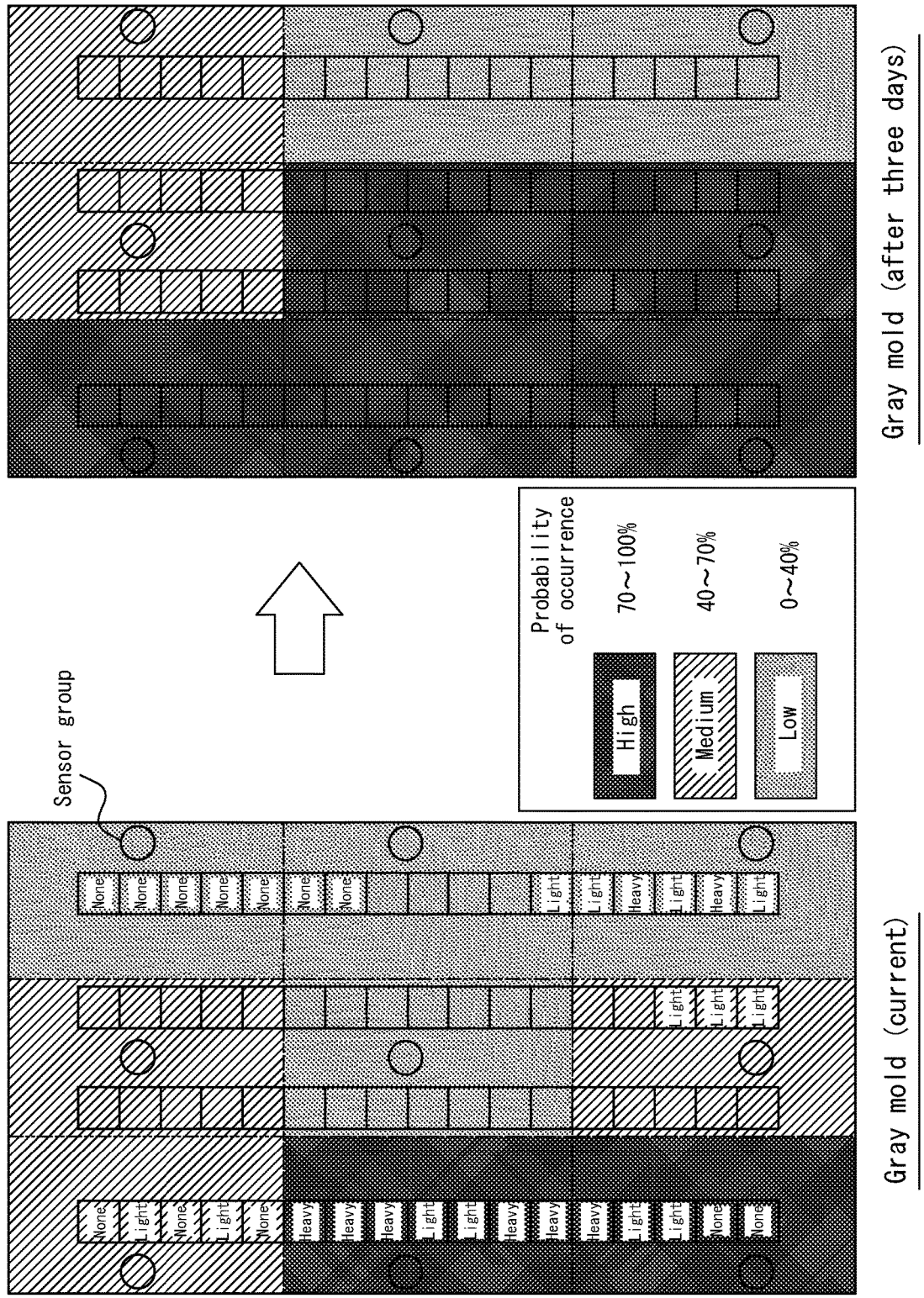
FIG. 13 is a schematic diagram illustrating example output of the process of step S306 in FIG. 10.

In step S304, the second controller 21 outputs the current and future probability of occurrence of disease and pests predicted in step S303 to the cultivation manager via the output interface 25. FIG. 13 illustrates an example of the output. In FIG. 13, the current and future probabilities of occurrence of gray mold are illustrated. However, in step S304, the indicators such as "heavy", "light", and "none" in FIG. 13 are not displayed. In this example, a probability of occurrence of 0% to less than 40% is defined as "low", a probability of occurrence of 40% to less than 70% is defined as "medium", and a probability of occurrence of 70% to 100% is defined as "high", but this example is not limiting. Here, the second controller 21 may transmit the data indicating the probability of occurrence of disease and pests to the mobile terminal 50 via the second communication interface 23 for display on a screen of the mobile terminal 50. This enables the cultivation manager to visually confirm the actual occurrence status of disease and pests and register the occurrence status on the mobile terminal 50 while prioritizing areas with a currently high probability of occurrence of disease and pests within each cultivation facility 60. The actual occurrence status of disease and pests is determined appropriately according to the severity of the occurrence level and is represented by, for example, the indicators "heavy", "light", and "none". However, these examples are not limiting. In addition, the cultivation manager can use the mobile terminal 50 to read a bar code or QR Code® (QR code is a registered trademark in Japan, other countries, or both) that is attached to each area of the cultivation facility 60 and indicates positional information in order to include information indicating the location of the occurrence of disease and pests in the information indicating the actual occurrence status of disease and pests. FIG. 14 illustrates an example of a screen of the mobile terminal 50. FIG. 14 illustrates that the current probability of occurrence of disease and pests in an area (Lane A, No. 6) of the cultivation facility 60 is "gray mold: high; powdery mildew: medium; leaf mold: low", and the actual occurrence status of disease and pests is "gray mold: heavy; powdery mildew: light; leaf mold: none". In this example, in a case in which the cultivation manager is an apprentice, the actual occurrence status of disease and pests is not confirmed visually by the cultivation manager but rather is determined appropriately by analysis, using any technology such as deep learning, of images of plants and the like captured by a camera of the mobile terminal 50 or the like. The future probability of occurrence of disease and pests is described in detail in the fourth example of operations.

In step S305, the second controller 21 acquires data indicating the actual occurrence status of disease and pests from the mobile terminal 50 via the second communication interface 23.

In step S306, the second controller 21 also outputs the data indicating the actual occurrence status of disease and pests, acquired in step S305, to the cultivation manager via the output interface 25. Preferably, the second controller 21 outputs the data indicating the actual occurrence status of disease and pests, acquired in step S305, to the cultivation manager via the output interface 25 together with the current probability of occurrence of disease and pests, predicted in step S303. The left side of FIG. 13 illustrates an example of the output.

Here, since the prediction model generated in the first example of operations is a prediction model generated using the data indicating the environment and data indicating the occurrence status of disease and pests in cultivation facilities 60 across the nation, the prediction model is not necessarily customized for each cultivation facility 60. Consequently, the current probability of occurrence of disease and pests, predicted in step S303, does not necessary accurately reproduce the actual occurrence status of disease and pests, acquired in step S305. The prediction model generated in the first example of operations is therefore preferably customized for each cultivation facility 60 to improve the prediction accuracy of the probability of occurrence of disease and pests in each cultivation facility 60.

To this end, in step S307, the second controller 21 determines whether to update the prediction model, acquired from the second memory 22 in step S303, based on a comparison between the current probability of occurrence of disease and pests, predicted in step S303, and the actual occurrence status of disease and pests, acquired in step S305. In a case in which the second controller 21 determines to update the prediction model (step S307: YES), the process advances to step S308. In a case in which the second controller 21 determines not to update the prediction model (step S307: NO), the process is terminated. Since the cultivation manager can visually confirm the example output in FIG. 13, the second controller 21 may determine, in step S307, whether to update the prediction model based on an input from the cultivation manager. For example, the second controller 21 outputs a dialog box, via the output interface 25, asking the cultivation manager whether to update the prediction model. The second controller 21 also accepts, via the input interface 24, an operation by the cultivation manager to input a response indicating whether to update the prediction model.

In step S308, the second controller 21 adds the data indicating the environment of the cultivation facility 60, acquired in step S301, and the data indicating the actual occurrence status of disease and pests, acquired in step S305, to the existing data and performs machine learning by the same method as in steps S102 and S103. When machine learning by the second controller 21 is completed, the prediction model is updated. The second controller 21 replaces the prediction model stored in the second memory 22 with the updated prediction model.

By repetition of steps S303 through S308, the prediction accuracy of the probability of occurrence of disease and pests in each cultivation facility 60 is further improved. If the environment of a particular cultivation facility 60 changes due to a change in the climate or season, the prediction accuracy of the prediction model may decrease. Therefore, the second controller 21 may perform the same clustering as in step S203 after step S307 and before step S308. However, from the perspective of time and volume of calculation, the frequency of this clustering is preferably around once every few months to once a year.

According to the third example of operations, the cultivation manager can prioritize management of areas with a high probability of occurrence of disease and pests within each cultivation facility 60. This enables efficient management of the cultivation facility 60 with less labor. Furthermore, according to the third example of operations, a prediction model is generated considering the actual occurrence status of disease and pests in each cultivation facility 60. The prediction accuracy of the prediction model for each cultivation facility 60 thus improves.

Figure 15:
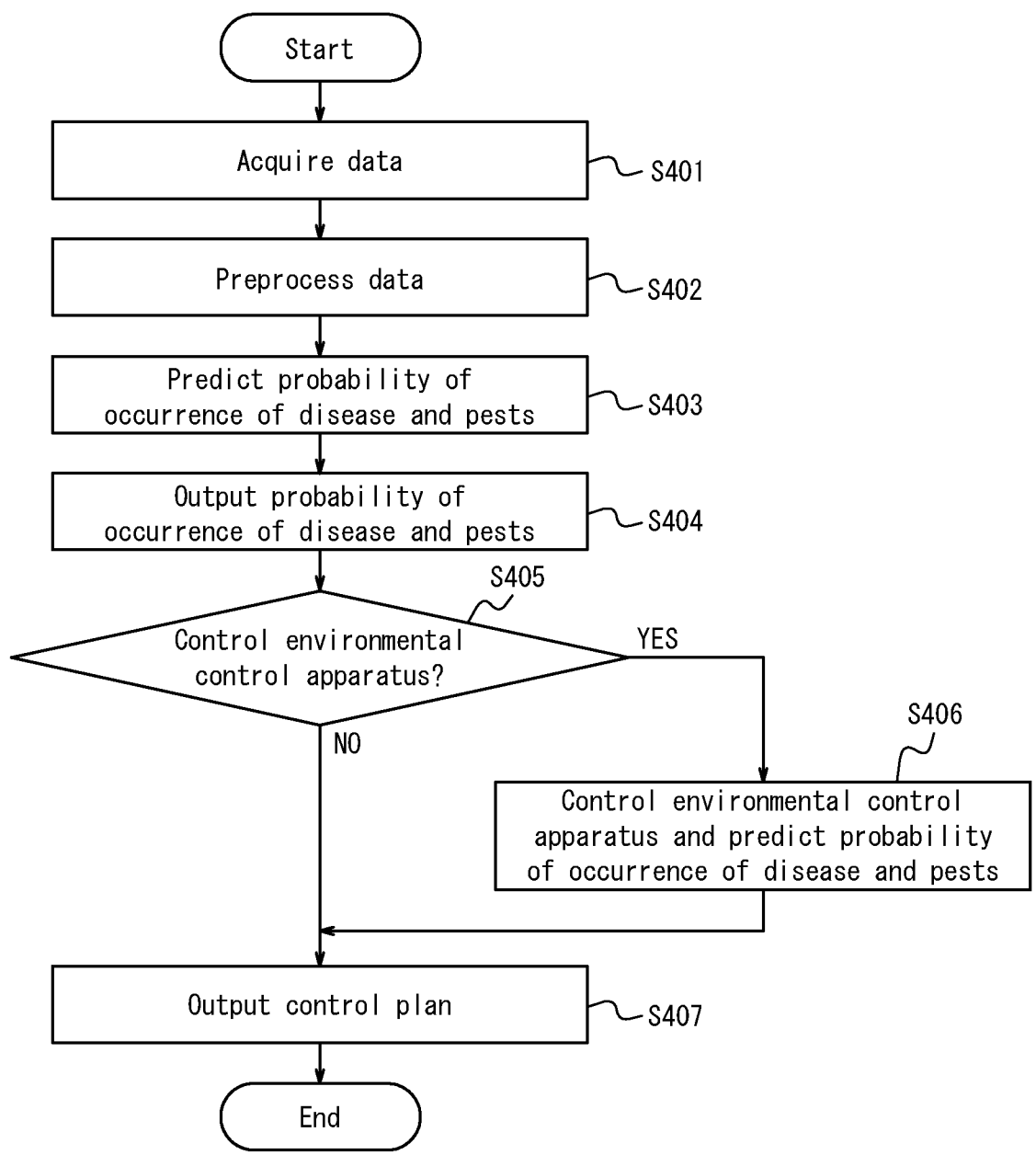
FIG. 15 is a flowchart illustrating a fourth example of operations by the support system according to the present embodiment.

With reference to FIG. 15, a fourth example of operations by the support system 1 according to the present embodiment is described. The fourth example of operations corresponds to an embodiment of a support method according to the present disclosure.

The fourth example of operations begins in a state in which the prediction model customized for each cultivation facility 60 in the third example of operations has been stored in the second memory 22 of the client apparatus 20. However, the fourth example of operations need not be performed in all of the cultivation facilities 60 nationwide and may be performed in a particular cultivation facility 60.

In step S401, the second controller 21 of the client apparatus 20 acquires data indicating the environment of the cultivation facility 60 from the sensor group 30 at predetermined time intervals and stores the data in the second memory 22.

In step S402, the second controller 21 acquires the data indicating the environment from the second memory 22 and performs preprocessing on the data. This preprocessing is the same as in step S102.

In step S403, the second controller 21 acquires the prediction model from the second memory 22 and predicts the current and future probability of occurrence of disease and pests. Step S403 is similar to step S303.

In step S404, the second controller 21 outputs the current and future probability of occurrence of disease and pests predicted in step S403 to the cultivation manager via the output interface 25.

In step S405, the second controller 21 determines, based on input from the cultivation manager, whether to control an environmental control apparatus 40 installed in the cultivation facility 60. For example, the second controller 21 outputs a dialog box, via the output interface 25, asking the cultivation manager whether to control the environmental control apparatus 40. The second controller 21 also accepts, via the input interface 24, an operation by the cultivation manager to input a response indicating whether to control the environmental control apparatus 40. At this time, the cultivation manager can make a comprehensive determination of the current and future probability of occurrence of disease and pests outputted in step S404. In a case in which the second controller 21 determines to control the environmental control apparatus 40 (step S405: YES), the process advances to step S406. In a case in which the second controller 21 determines not to control the environmental control apparatus 40 (step S405: NO), the process advances to step S407.

In step S406, the second controller 21 acquires, based on input from the cultivation manager, a target value for the value indicated by the environmental control apparatus 40. For example, the second controller 21 accepts, via the input interface 24, an operation by the cultivation manager to input the target value. At this time, the cultivation manager can determine the target value so that the probability of occurrence of disease and pests is lowered. The second controller 21 controls the environmental control apparatus 40 so that the value indicated by the environmental control apparatus 40 reaches the acquired target value. The second controller 21 also predicts the future probability of occurrence of disease and pests for the case in which the value indicated by the environmental control apparatus 40 reaches the target value. This prediction is made by the same method as in step S303, by the second controller 21 setting the evidence of the parent node corresponding to the target value to "1".

Here, in the fourth processing example, the names of chemicals capable of controlling disease and pests and the timing of application are associated in advance with the type of disease and pests and the probability of occurrence, based on past performance data or the like, and are stored in the second memory 22.

In step S407, the second controller 21 refers to the second memory 22 and generates, based on the future probability of occurrence of disease and pests predicted in step S404, a control plan including the name of a chemical for controlling disease and pests and the timing of application. Alternatively, the second controller 21 refers to the second memory 22 and generates, based on the future probability of occurrence of disease and pests predicted in step S406 for the case of controlling the environmental control apparatus 40, a control plan including the name of a chemical for controlling disease and pests and the timing of application. The second controller 21 outputs the generated control plan to the cultivation manager via the output interface 25. The upper tier of FIG. 16 illustrates the control plan generated based on the future probability of occurrence of disease and pests predicted in step S406 for the case of controlling the environmental control apparatus 40. The lower tier of FIG. 16 illustrates the control plan generated based on the future probability of occurrence of disease and pests predicted in step S404. The control plan in FIG. 16 includes, for example, a control plan for a case in which the occurrence level of disease and pests in the area where a sensor group (No. 2) is disposed is "light". In the case of controlling the environmental control apparatus 40, the cultivation manager can recognize from the control plan in FIG. 16 that chemical B (effect: fungicide) should be applied within 2 days. On the other hand, in the case of not controlling the environmental control apparatus 40, the cultivation manager can recognize from the control plan in FIG. 16 that chemical B (effect: fungicide) needs to be applied immediately.

According to the fourth example of operations, the environmental control apparatus 40 is controlled to reduce the probability of occurrence of disease and pests in each cultivation facility 60. This can suppress damage by disease and pests. Furthermore, based on the control plan, the cultivation manager can efficiently determine the work schedule and the timing and amount of chemicals to be ordered and can therefore efficiently manage the cultivation facility 60.

The present disclosure is based on drawings and embodiments, but it should be noted that a person of ordinary skill in the art could make a variety of changes or modifications based on the present disclosure. Therefore, such changes and modifications are to be understood as included within the scope of the present disclosure. For example, the functions and the like included in the various steps and the like may be reordered in any logically consistent way. Furthermore, a plurality of steps or the like may be combined into one, or a single step or the like may be divided.

Figure 17:
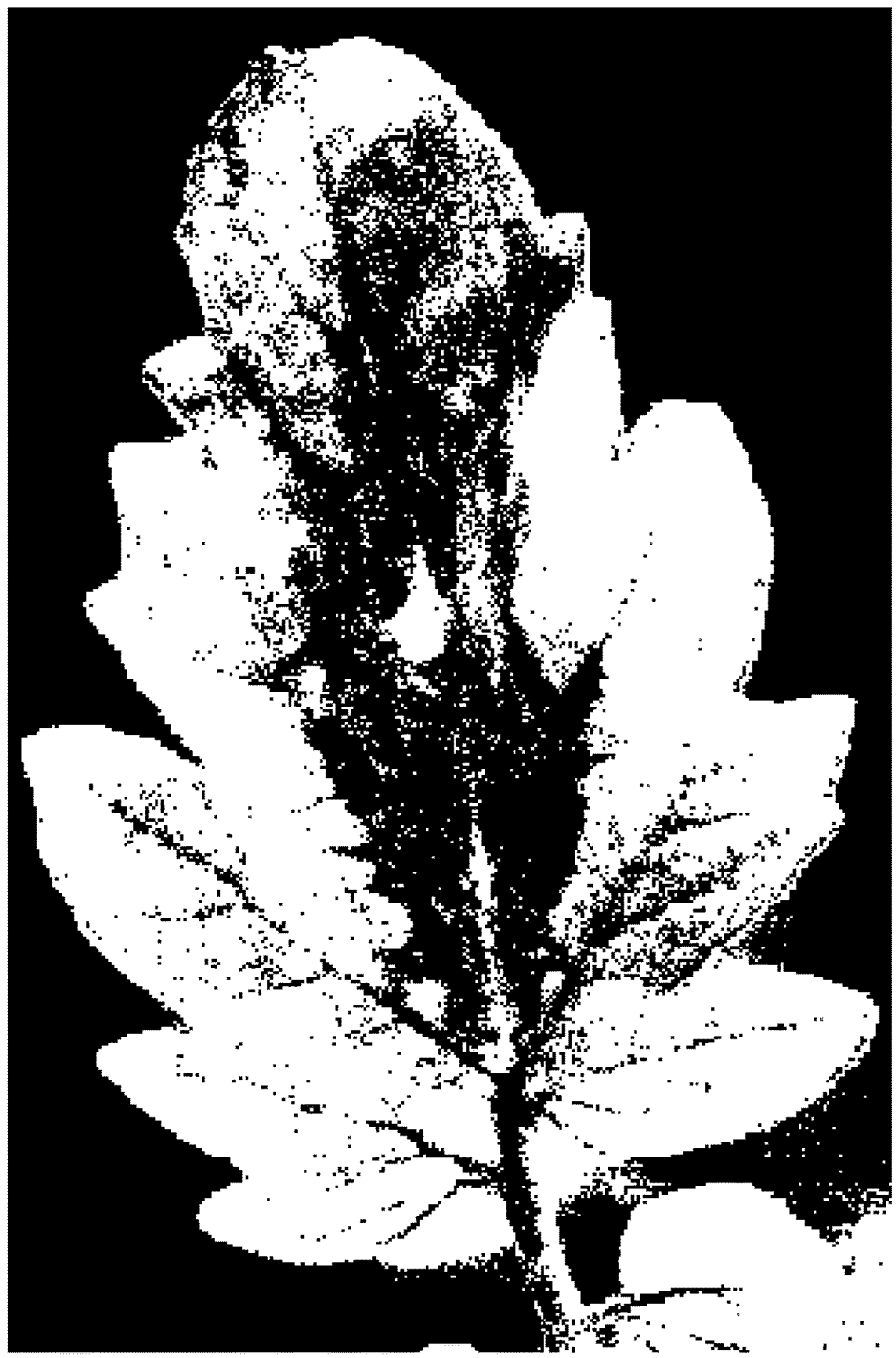
FIG. 17 is an analysis image by a spectral camera.

For example, the sensor group 30 illustrated in FIG. 1 may include a spectrum camera that can measure parameters such as chlorophyll content, which is important for photosynthesis. Here, when plants or the like are stressed by disease or pests, photosynthesis in the region experiencing stress ("stressed region") is inhibited. Therefore, the area of the stressed region, calculated by analyzing the images captured by the spectrum camera based on reflection intensity, normalized vegetation index, or the like, or the amount of change over time in the area may be added to the explanatory variables of the prediction model. In FIG. 17, the black region within the region represented in white (corresponding to a "leaf") corresponds to the stressed region. A prediction model for detecting the onset or high risk of a particular disease or pest may also be generated using machine learning, such as random forest, based on a parameter such as the reflection intensity of a characteristic wavelength of each pixel in the captured image. This improves the prediction accuracy of the probability of occurrence of disease and pests.

INDUSTRIAL APPLICABILITY

According to the present disclosure, a support system and a support method that enable an efficient understanding of the occurrence status of disease and pests in a cultivation facility can be provided.

REFERENCE SIGNS LIST

1 Support system
10 Server apparatus
11 First controller
12 First memory
13 First communication interface
20 Client apparatus
21 Second controller
22 Second memory
23 Second communication interface
24 Input interface
25 Output interface
30 Sensor group
40 Environmental control apparatus
50 Mobile terminal
60 Cultivation facility
70 Network

The invention claimed is:

1. A support system comprising:
a first memory storing data indicating an environment of at least one cultivation facility and data indicating an occurrence status of disease and pests; and
a first controller configured to perform machine learning using the data indicating the environment as an explanatory variable and the data indicating the occurrence status of disease and pests as an objective variable acquired from the first memory to generate a prediction model for predicting a probability of occurrence of disease and pests in the cultivation facility,
wherein the first controller
performs preprocessing on the data indicating the environment and the data indicating the occurrence status of disease and pests;
performs clustering with respect to a time series using the data indicating the environment and the data indicating the occurrence status of disease and pests on which the preprocessing is performed; and
performs structural learning using the clustering results to generate a Bayesian network as the prediction model, said Bayesian network including parent nodes corresponding to the data indicating the environment, child nodes corresponding to the clustering results, and child nodes corresponding to the probability of occurrence of diseases and pests.

2. The support system according to claim 1, further comprising:
a sensor group configured to measure the data indicating the environment of the cultivation facility;
a second controller configured to input the data indicating the environment acquired from the sensor group to the prediction model and predict the probability of occurrence of disease and pests in the cultivation facility; and
an output interface configured to output the probability of occurrence of disease and pests predicted by the second controller.

3. The support system according to claim 2, wherein the output interface further outputs data indicating an actual occurrence status of the disease and pests in the cultivation facility.

4. The support system according to claim 3, wherein the second controller updates the prediction model by performing machine learning using the data indicating the environment measured by the sensor group and the data indicating the actual occurrence status of the disease and pests.

5. The support system according to claim 2, wherein the second controller controls an environmental control apparatus installed in the cultivation facility to reduce the probability of occurrence of the disease and pests in the cultivation facility based on an input from a cultivation manager.

6. The support system according to claim 2, wherein
the second controller generates a control plan for the disease and pests based on the probability of occurrence of disease and pests in the cultivation facility, and
the output interface outputs the control plan generated by the second controller.

7. The support system according to claim 2, wherein
the second controller optimizes a location or number of sensors included in the sensor group based on the data indicating the environment of the cultivation facility, and
the output interface outputs the optimized location or number of the sensors.

8. A support method using a computer, the support method comprising:
performing, by the computer, machine learning using data indicating an environment of at least one cultivation facility as an explanatory variable and data indicating an occurrence status of disease and pests as an objective variable to generate a prediction model for predicting a probability of occurrence of disease and pests in the cultivation facility, wherein
the performing the machine learning includes:
preprocessing on the data indicating the environment and the data indicating the occurrence status of disease and pests:
clustering with respect to a time series using the data indicating the environment and the data indicating the occurrence status of disease and pests on which the preprocessing is performed; and
structural learning using the clustering results to generate a Bayesian network as the prediction model, said Bayesian network including parent nodes corresponding to the data indicating the environment, child nodes corresponding to the clustering results, and child nodes corresponding to the probability of occurrence of diseases and pests.

9. The support method of claim 8, further comprising:
acquiring, by the computer, the data indicating the environment of the cultivation facility;
inputting, by the computer, the acquired data indicating the environment to the prediction model and predicting the probability of occurrence of disease and pests in the cultivation facility; and
outputting, by the computer, the predicted probability of occurrence of disease and pests.

* * * * *